Figure 1A:
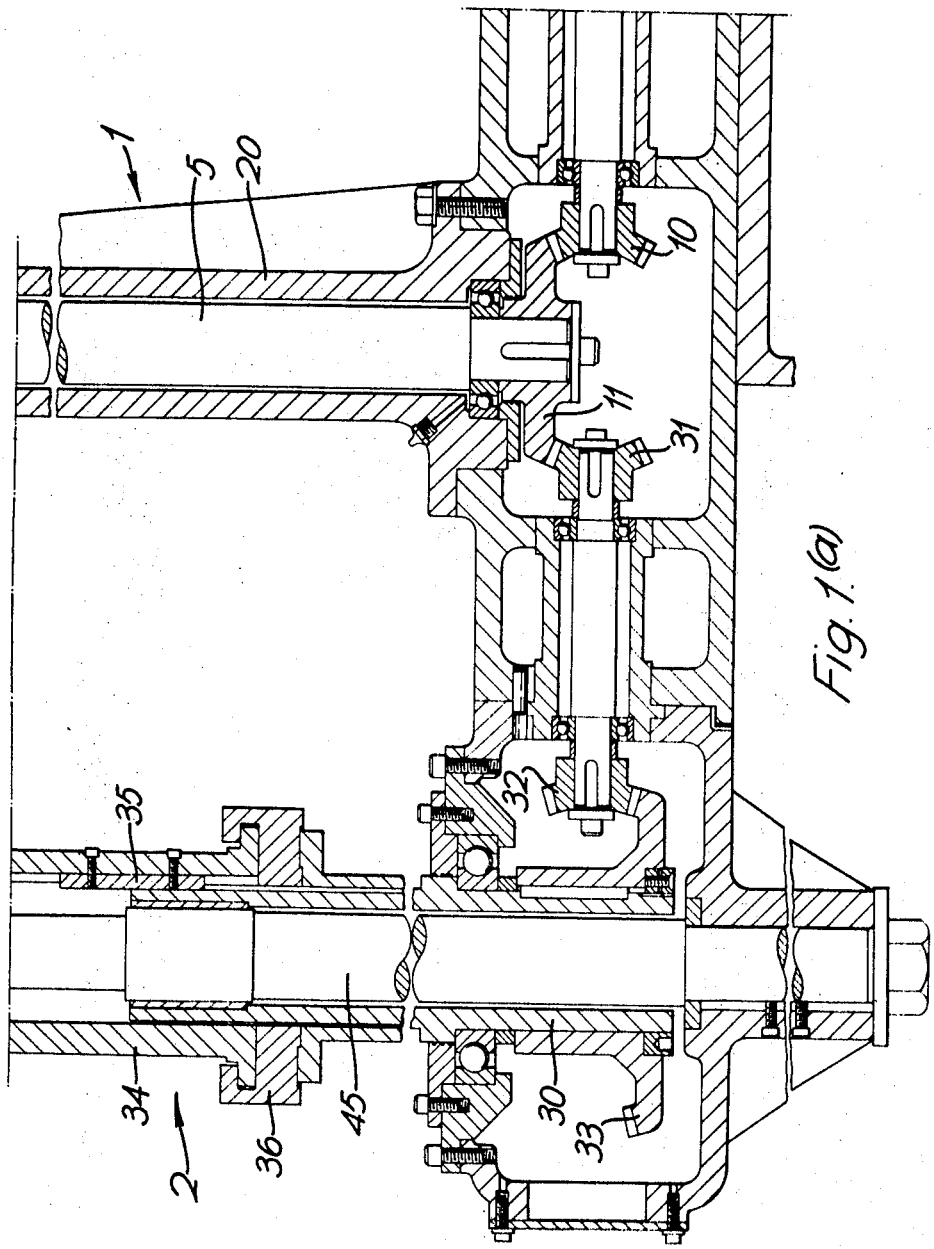

United States Patent

[11] 3,608,744

| [72] | Inventors | Francis Joseph Ward<br>Burtonwood, near Warrington;<br>Derek Grimes, St. Helens, both of England |
|------|-----------|---|
| [21] | Appl. No. | 773,405 |
| [22] | Filed | Nov. 5, 1968 |
| [45] | Patented | Sept. 28, 1971 |
| [73] | Assignee | Ravenhead Glass Limited<br>St. Helens, England |
| [32] | Priority | Nov. 6, 1967 |
| [33] | | Great Britain |
| [31] | | 50444/67 |

[54] TRANSFER DEVICE FROM FOOT-FORMING MACHINE TO BURN-OFF MACHINE
13 Claims, 7 Drawing Figs.

[52] U.S. Cl. .................................................. 214/1 BC,
198/25
[51] Int. Cl. .................................................. B65g 29/00
[50] Field of Search ........................................... 214/1 BB, 1
BC, 1 B; 198/22, 25

[56] References Cited
UNITED STATES PATENTS

| 3,392,492 | 7/1968 | Stein ............................. | 198/25 X |
| 2,888,131 | 5/1959 | Allen ............................. | 214/1 BB X |
| 3,175,702 | 3/1965 | Banyas ......................... | 214/1 BB |
| 3,225,941 | 12/1965 | Slattery ....................... | 214/1 BB |

Primary Examiner—Gerald M. Forlenza
Assistant Examiner—George F. Abraham
Attorney—Cushman, Darby & Cushman ABSTRACT: Article transfer apparatus particularly for use in glassmaking, comprises a first continuously rotating device carrying a plurality of pivotally mounted article-engaging members, and a second continuously rotating device carrying a plurality of article-gripping members adapted to receive articles from said article-engaging members, wherein said first and second devices rotate in the same direction and in synchronism, the pitch circles of the article-engaging members and the article-gripping members overlap, and means associated with the first device causes each article-engaging member to pivot to effect transfer of an article therefrom to an article-gripping member.

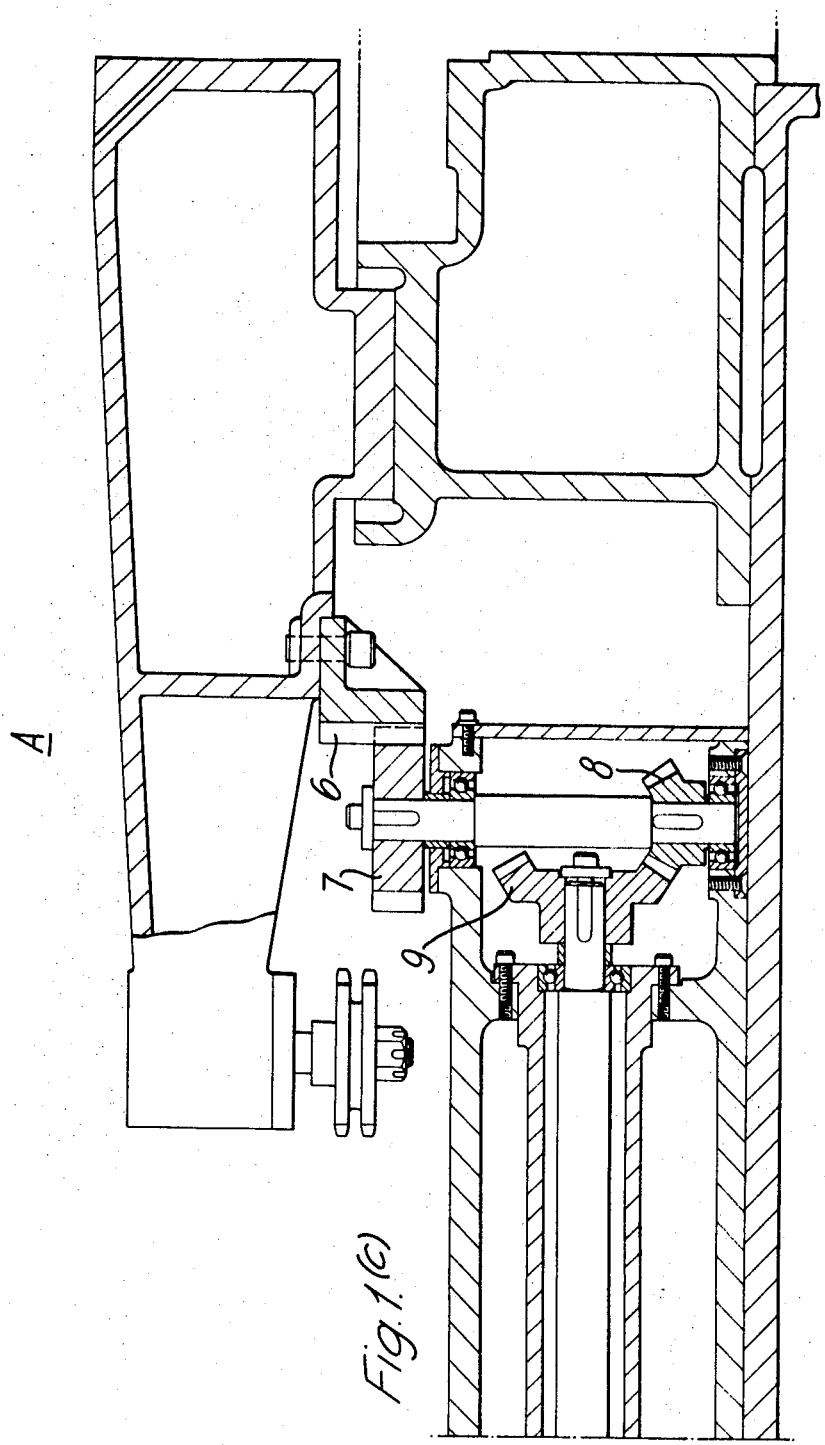

3,608,744

TRANSFER DEVICE FROM FOOT-FORMING MACHINE TO BURN-OFF MACHINE

This invention relates to article transfer devices and is especially concerned with the provision of a novel article transfer device for use, for example, in the glass industry.

The manufacture of articles of glassware is a highly diverse art, and each different type of glass article requires a different sequence of operations for its production. Certain articles require more operations in their production than do others. For instance, a simple pressed article of glassware such as a bowl requires a single operation only, namely that of pressing into shape a molten charge of glass supplied to a forming mould. Other glass articles, for example bottles, require two sequential operations, namely a blowing or pressing operation followed by a blowing operation. In the manufacture of stemware, i.e. ware such as wine glasses having a bowl, a stem and a foot, four operations are involved, namely the blowing of the bowl, the moulding of a stem and partial forming of a foot thereon, the final forming the foot and the burning off of the excess material with which the bowl is necessarily provided for handling purposes.

The formation of stemware is carried out by charging a mould with a gob of molten glass, e.g. by gravity feed or suction, and forming this gob in the mould into the shape required for the bowl of the ware, the bowl also being provided with a moil portion which is necessary for its transference to a stem and foot-moulding machine. In this respect attention is directed to our copending Application No. 14357/66. The bowl thus formed is picked up by means of the moil portion and is transferred to a stem and foot-moulding machine (for example in accordance with the aforementioned application), in which a gob of molten glass is deposited on the bottom of the bowl and is moulded into the shape of a stem and foot. The bowl with its formed stem and semiformed foot is transferred into a foot-forming machine, a transfer device integral with the said machine being used for this purpose. Under the action of applied heat and pressure during which the bowl is rotated, a concentric and flat foot is formed. The partially formed stemware must then be transferred to a machine which will burn off the moil, and this operation wherein the partially formed stemware must be transferred from a machine in which it is held by the moil portion to a machine wherein it is held by the foot portion, has hitherto been effected manually.

Nowadays, the automatic handling of ware, if it is possible, is considered to be preferable to manual handling, and it is the object of the present invention to provide an automatic device for transferring an article from one position to another, for example from one machine performing one operation on the article to a second machine performing a second operation on it. It is a particular object of the invention to provide a device for automatically transferring partially formed glass stemware from a machine effecting the foot-forming operation to a machine for burning off the excess glass or moil formed as part of the bowl.

According to the invention an article transfer apparatus comprises a first continuously rotating device carrying a plurality of pivotally mounted article-engaging members, and a second continuously rotating device carrying a plurality of article-gripping members adapted to receive articles from said article-engaging members, wherein said first and second devices rotate in the same direction and in synchronism, the pitch circles of the article-engaging members and the article-gripping members overlap, and means associated with the first device causes each article-engaging member to pivot to effect transfer of an article therefrom to an article gripping member.

The article-engaging members which are carried on the first device suitably comprise vertically reciprocable cradles, which cradles are forked. This vertical reciprocation allows them to engage an article and lift it off a machine in which it is disposed. For example, in the case of glass stemware the articles will be travelling on vertically disposed spindles. Thus the cradles will contact the articles and lift them off the spindles. The reciprocation is preferably effected by means of a pneumatic or hydraulic cylinder mounted above each cradle, the cylinder being actuated twice during a complete circuit by the cradle, once to lower the cradle, and once to raise it. There is preferably a two-way valve connected to each cylinder, the piston of the valve carrying a cam follower which runs on a stationary cam mounted on the first device. The piston is actuated twice during a complete circuit to operate the cylinder and hence the cradle. In a particular embodiment each cradle is mounted on the outer end of an arm, which also carries the cylinder, which arm is pivotally mounted on a plate or spider attached to, and moving with, a continuously rotating shaft. The inner end of each arm is provided with a cam roller which runs in a stationary cam to govern the path of movement of the cradle.

The article gripping members preferably each comprise two cooperating gripping jaws, spring-biased in the closed position and openable by means of a cam roller associated with each pair of jaws following a suitably shaped stationary cam which is preferably associated with the second device.

The two rotating devices are preferably driven from a common drive, which is preferably the same drive which drives one of the other machines involved in the transfer operation. For example, if the apparatus of the invention is being used to transfer partially formed stemware from a rotary foot-forming machine to a moil burnoff machine then the drive for the two devices forming the transfer apparatus is preferably that which also drives the foot-forming machine.

The stationary cam governing the movement of the cradles on the first device also preferably causes the pivoting movement of the arm at the moment of transfer, and for this reason it has a profile the major part of which is circular but which has a suitably shaped reentrant portion corresponding to the position of transfer of an article from the first device to the second.

This cam preferably is formed as a groove in a stationary plate which is associated with the first rotating device, and in which the cam roller on the inner end of each cradle-carrying arm is adapted to run.

Figure 1B:
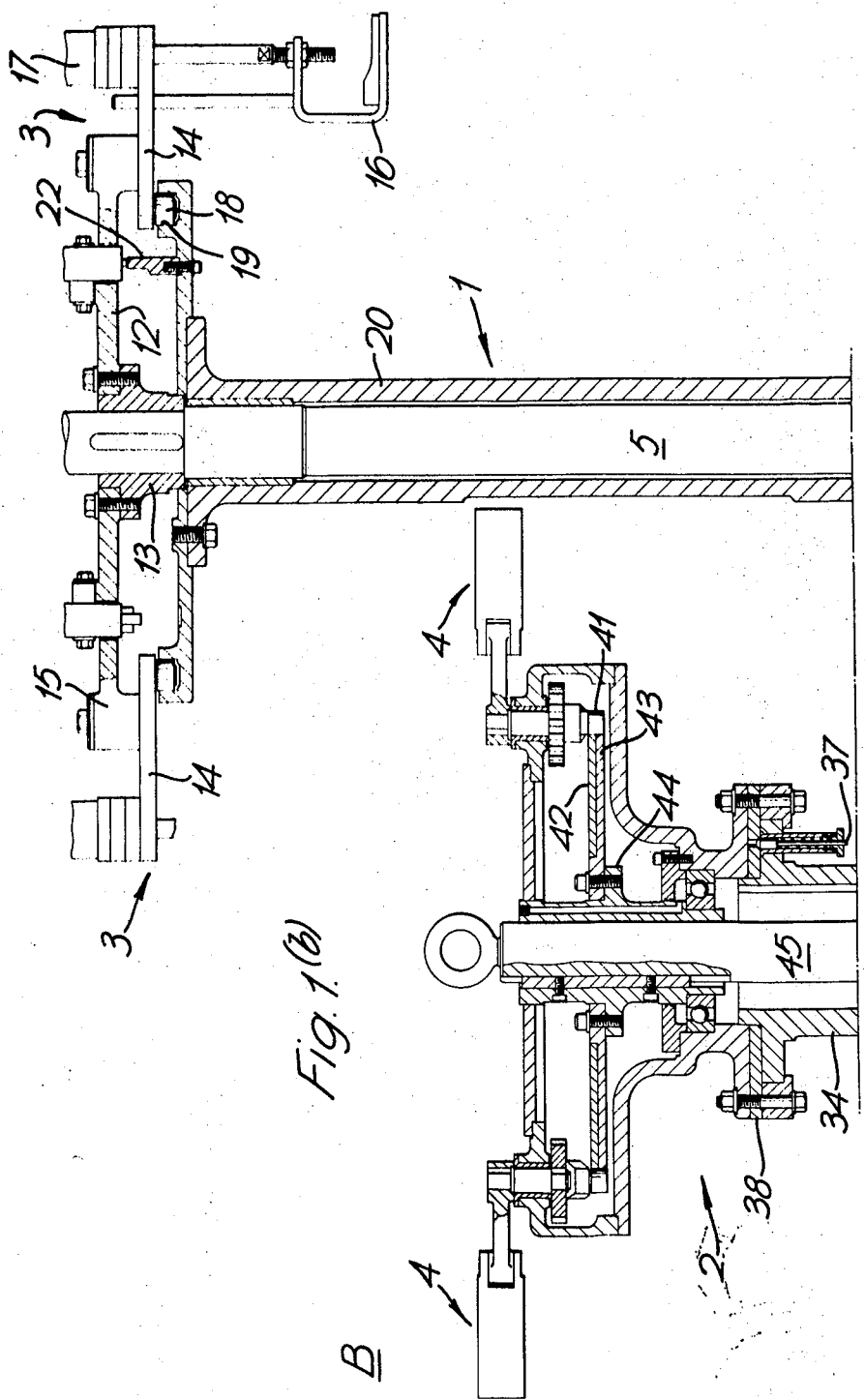
Figure 2:
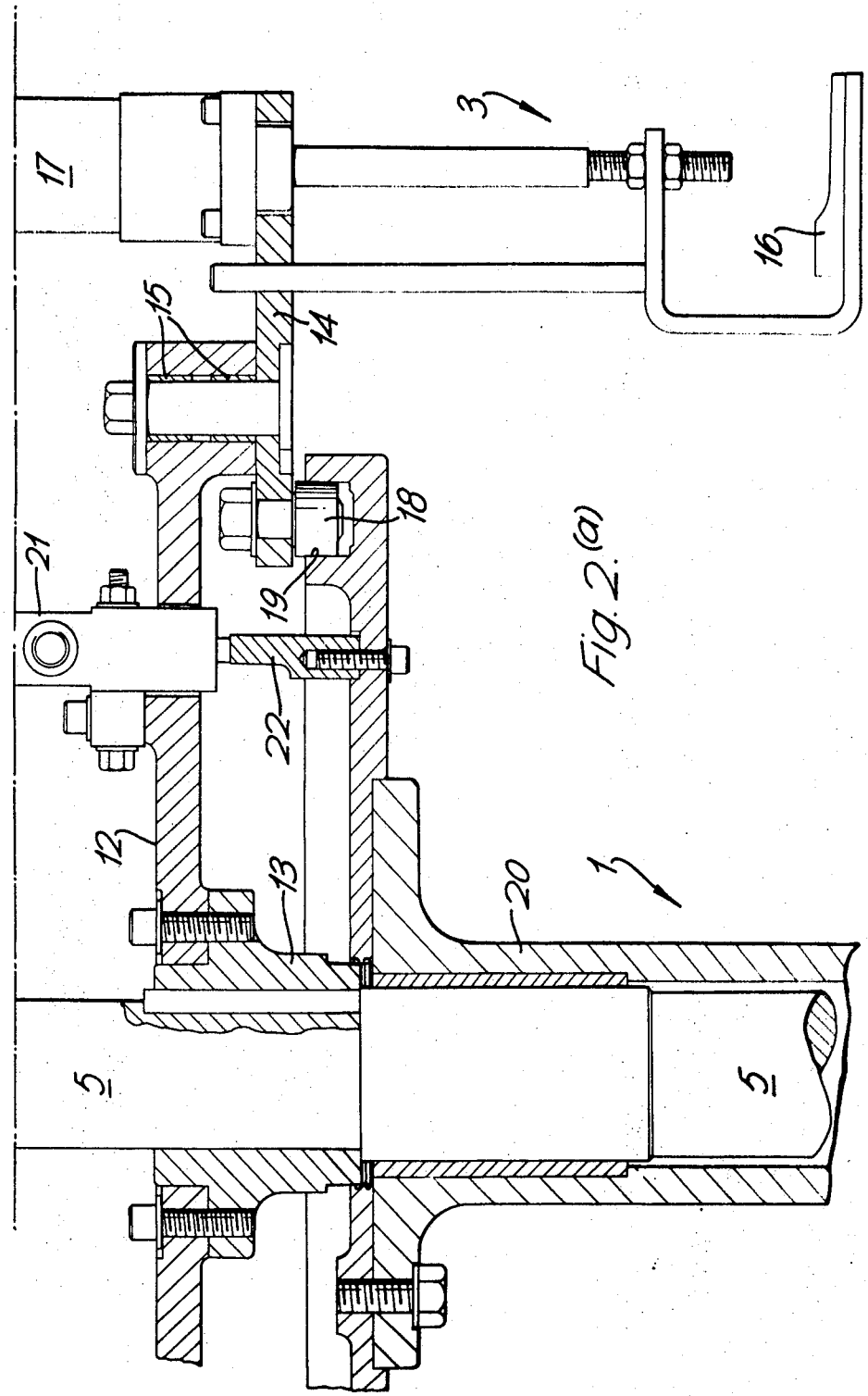
Figure 2B:
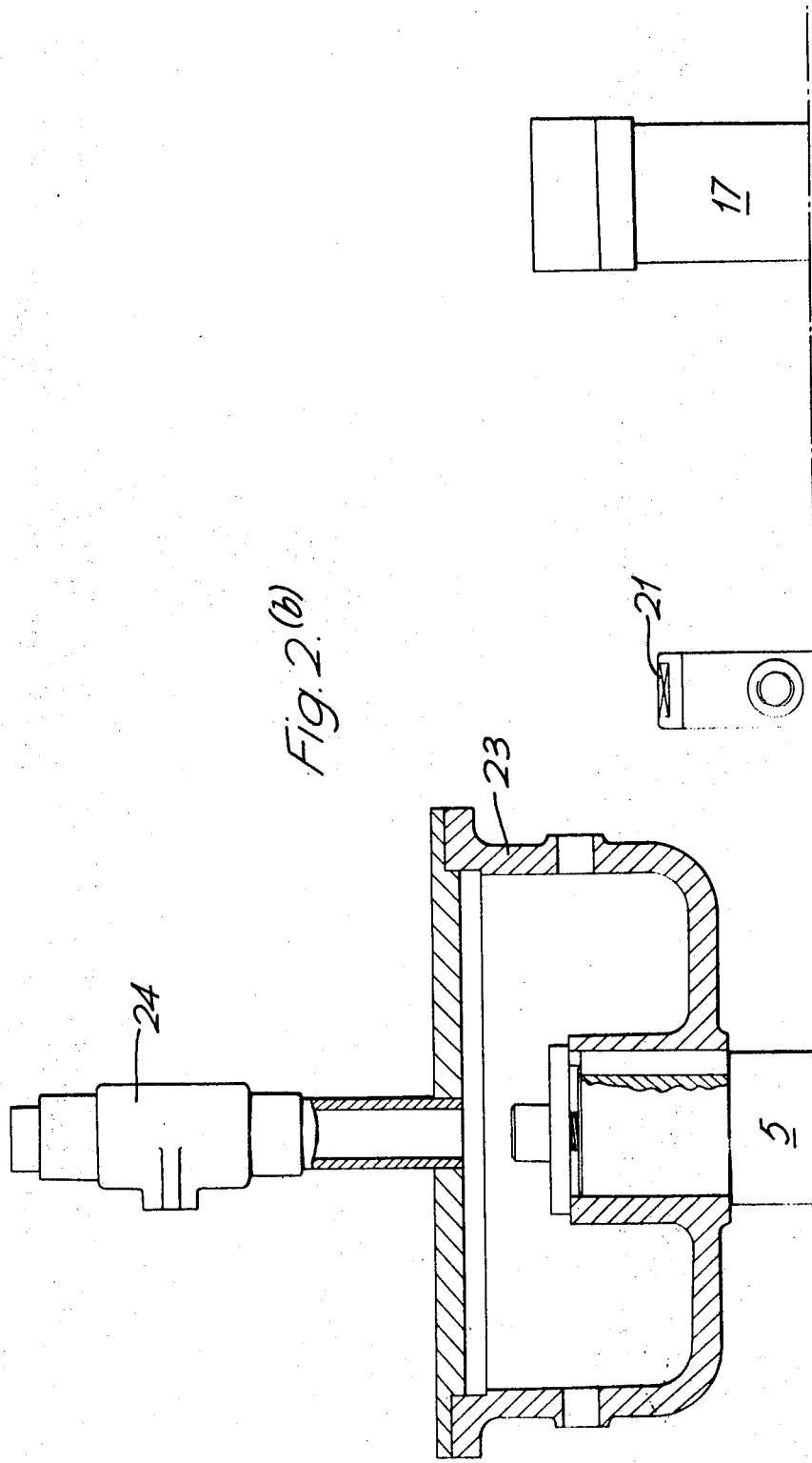
Figure 3:
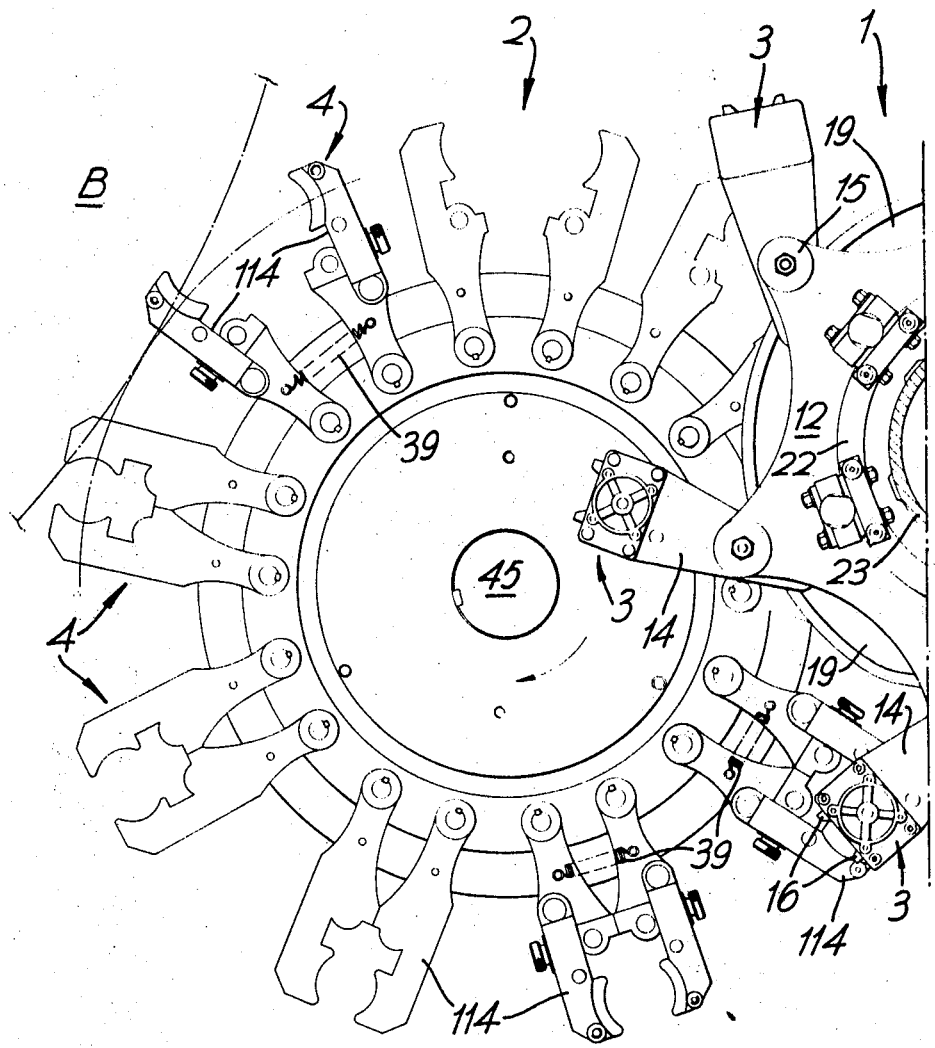
Figure 3:
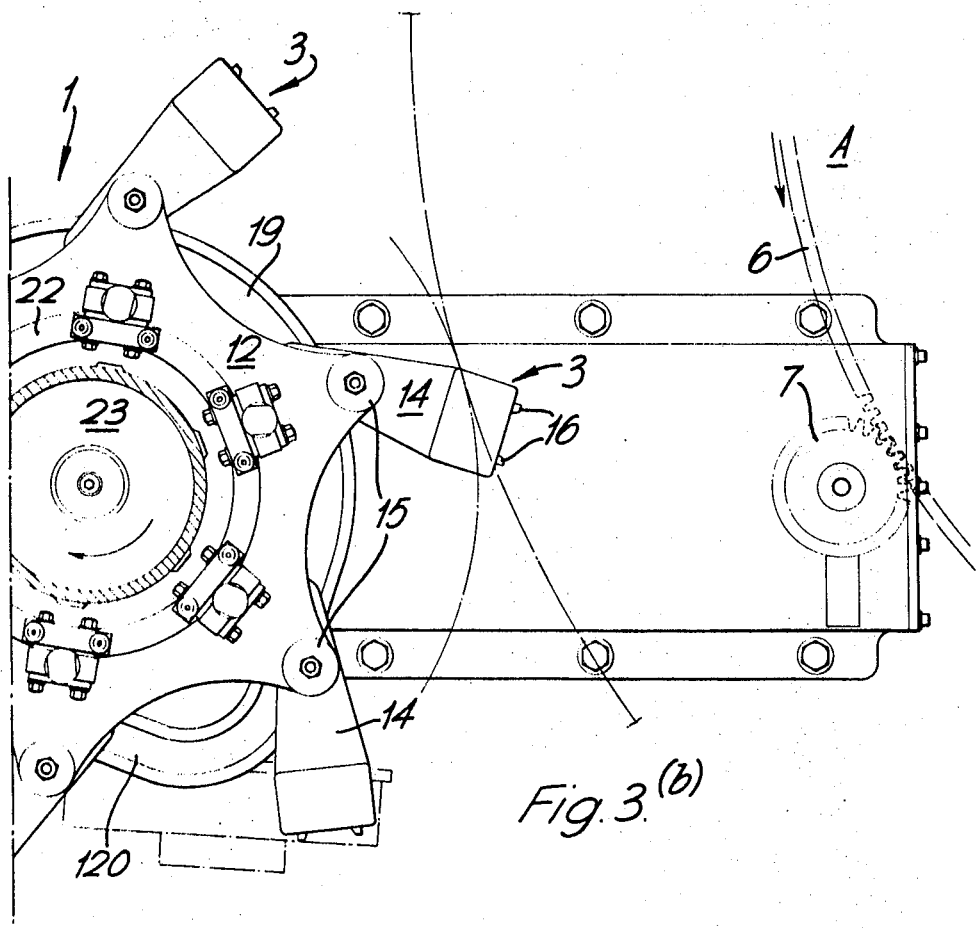

An exemplary embodiment of a transfer apparatus according to the invention for use in the glass industry will now be described with reference to the accompanying drawings, in which FIG. 1 is a composite sectional elevation (shown in the drawing as FIGS. 1a, b, c ) of the two rotary devices comprising the article transferring apparatus;

FIG. 2 is a composite sectional elevation (shown in the drawings as FIGS. 2a, b) of part of one of the devices shown in FIG. 1, on an enlarged scale; and FIG. 3 is a composite view (shown in the drawing as FIGS. 3a, b) of the apparatus shown in FIG. 1.

With reference to the drawings, and especially to FIGS. 1 and 3, the position of a foot-forming machine is indicated generally at A, and the position of a moil burnoff machine is indicated generally at B. Foot-forming machines and moil burnoff machines are well known in the glass industry, do not form part of this invention, and will therefore not be described further. The transfer apparatus according to the invention, which as mentioned above serves the purpose of removing a partially formed article of stemware from machine A and placing it in machine B, comprises two synchronously operated continuously rotating devices designated 1 and 2 respectively. Device 1 is adapted to extract partially formed stemware from machine A, and for this purpose is provided with a number of cradles 3 each of which lifts up a piece of stemware by its foot-portion, to carry the stemware along a predetermined circular path, and to deposit it in device 2 wherein it is held, in one of a series of gripping members, by means of its bowl or moil portion. Device 2, which rotates in the same direction as does device 1, carries the partially formed stemware to a position at which it deposits it in machine B, wherein it is received and held by means of its foot portion in such a manner that the moil may be burnt off and the article of stemware finished.

It will be seen that in the particular embodiment illustrated (see especially FIG. 3) device 1 is provided with a set of six article carrying devices or cradles 3, and device 2 comprises nine sets of carrying devices in the form of gripping jaws 4. (Not all the cradles and gripping jaws are shown in detail in FIG. 3.) As is shown in FIG. 1, both devices 1 and 2 are driven continuously (and in clockwise direction as seen in FIG. 3) from the foot-forming machine A by means of a gear train which will be described in more detail below. It will be appreciated that for effective operation in this particular manufacturing process the speeds of the foot-forming machine A and the burnoff machine B must be synchronized, and this is accomplished in known manner by the use of selsyn motors.

In detail, rotary device 1 comprises a continuously rotating shaft 5, which is driven from a drive gear 6 of the foot-forming machine A through a pinion 7 and a series of bevel gears 8–11. Rotation of shaft 5 causes a spider 12 (see FIGS. 2 and 3), mounted on an adapter bush 13 which is keyed to shaft 5, also to rotate. The spider 12 carries six arms 14 each of which is pivotally mounted on the spider by means of a bearing 15, and is provided at its outer end with a carrying mechanism 3 comprising a forked lifting cradle 16 and a lifting cylinder 17. The spider 12 thereby rotates with the shaft 5 and the movement of arms 14, which is essentially circular, is controlled by a cam roller 18 mounted on the end of each arm 14 running in a stationary cam 19 which is fixed on the outer column 20 of device 1. Reference will be made later to the shape of cam 19.

The lifting cylinder 17 is operated by means of a valve 21 which is controlled by a series of cams 22. Air supply for the cylinders 17 is taken from an air chamber 23 mounted on shaft 5 and supplied with air through a rotary joint 24.

Device 2 is also a continuously rotating unit and comprises a continuously rotating sleeve 30. This is driven in synchronism with device 1 by means of bevel gears 11, 31, 32 and 33. Continuously driven sleeve 30 is connected to a clutch housing 34 by means of a key 35, and clutch housing 34 is adapted to be raised and lowered by means of a nut 36 which is engaged in a screw thread on sleeve 30. The assembly of gripping jaws 4 is mounted on the clutch housing 34, and is driven through clutch pins 37 via a clutch plate 38. Clutch housing 34, and consequently the assembly of gripping jaws 4, is provided with means for raising and lowering it so as to be capable of receiving and transferring stemware of any height.

The gripping jaws 4, which as will be seen from FIG. 3 are normally spring-loaded in the closed position by means of springs 39, are opened by means of cam rollers 41 associated with each pair of jaws 4 engaging a cam 42 mounted on a cam plate 43 which is in turn mounted on a bush 44 attached to a stationary shaft 45.

As will be seen most clearly from FIG. 3, the pitch circles of the carrying mechanisms 3 and the gripping jaws 4 overlap to an extent which is determined by the respective sizes of the two rotary devices and the number of article carrying devices attached to each, and clearly it is necessary, therefore, in order for a lifting cradle 16 (FIG. 3) to deposit a stemmed article in a pair of gripping jaws 114 and then to continue along its substantially circular path without interfering with the continuous movement of the jaws 114, for the cradle 16 to pivot such that at the moment of transference of an article of ware from device 1 to device 2 the cradle 16 and the jaws 114 are moving at the same speed and in the same direction. It will be appreciated from a study of FIG. 3 that if the cradles 16 were allowed to continue on their strict circular path during transfer they would carry the ware with them rather than transfer it. The pivotal movement is caused by a reentrant portion 120 being formed in the cam 19, and when a cam roller 18 rolls into portion 120 it swings the arm 14 around into a position such that jaws 114 may slide the stemware article off the cradle 16. This is, of course, a very rapid operation, and immediately thereafter, with roller 18 following cam 19, the arm is pivoted back into initial position for extracting another article of stemware from machine A. The movement of cradle 16 at the position of reentrant portion 120 can be described as a rapid retardation followed by a rapid acceleration.

In operation, the continuously rotating device 1 brings each cradle 16 into engagement with the foot of an article of stemware partially formed in machine A. Cylinder 17 is actuated to raise cradle 16 and hence lift the stemware off the retaining spindles in machine A. Cradles 16 then carry the partially formed stemware in a circular path until the bowl or moil of the stemware is above a pair of gripping jaws 4 on device 2. Cylinder 17 is actuated to lower cradle 16 and hence the bowl or moil, and at the same time arm 14 carrying cradle 16 is caused to pivot by means of the cam portion 120, so that the speed of cradle 16 matches that of jaws 4 for an instant, during which jaws 4 close about the bowl or moil of the stemware. As jaws 4 continue on their circular path they slide the stemware off the cradle 16. Gripping jaws 4 continue to move in their circular path, now carrying the partially formed stemware. Cradle 16 once again resumes its circular path in order to extract a further article of stemware from machine A. Transfer device 2 deposits the partially formed stemware onto machine B, wherein it is held by means of its foot portion, for finishing.

The transfer apparatus described above takes up very little space on the shop floor, and effectively and safely transfers glass stemware from one operating machine to another, at high speed. The apparatus of the invention has been particularly described in relation to the transfer of partially formed glass stemware as it finds especial use in such application. However, it will be appreciated that a transfer apparatus of this kind will find use in other fields where the rapid automatic transfer of articles from one position to another is required.

We claim:

1. Apparatus for transferring articles from a first to a second station comprising a first device continuously rotating about a first vertical axis and carrying a plurality of pivotally mounted arms provided with article-engaging members for receiving vertically disposed articles from the first station, cam follower means on each said arm, and a second device continuously rotating about a second vertical axis and carrying a plurality of article-gripping members adapted to receive articles from said article-engaging members and transfer said articles to said second station, said first and second devices rotating in the same direction and in synchronism, the pitch circles of the article-engaging members and the article-gripping members which are formed by tracing the path of the central axes of the articles being carried thereby are overlapping and the path of movement of the article-engaging members being higher than that of the article-gripping members by a distance less than the vertical height of the articles and cam means associated with the first device and engageable by said cam follower means causing each arm to pivot to effect transfer of an article from its associated article-engaging member to an article-gripping member.

2. Apparatus as claimed in claim 1, wherein each article-engaging member comprises a vertically reciprocably forked cradle.

3. Apparatus as claimed in claim 2 wherein a pneumatic or hydraulic cylinder is associated with each article-engaging member and is actuable to cause the vertical reciprocation of its associated cradle.

4. Apparatus as claimed in claim 3 wherein the actuation of said cylinder is effected by means of a cam follower associated with the piston of a valve controlling the fluid supply to said cylinder running along a suitably shaped stationary cam.

5. Apparatus as claimed in claim 2 wherein each cradle is mounted on the outer end of an arm which is pivotally mounted in a plate attached to a continuously rotating shaft.

6. Apparatus as claimed in claim 1 wherein each article-gripping member comprises a pair of cooperating gripping jaws.

7. Apparatus as claimed in claim 6 wherein each pair of gripping jaws is spring-biased into the closed position.

8. Apparatus as claimed in claim 7 wherein the opening and closing of the gripping jaws is effected by means of a cam roller associated with each pair of jaws following a suitably shaped stationary cam.

9. Apparatus as claimed in claim 1 wherein the first and second continuously rotating devices are driven from a common drive.

10. Apparatus as claimed in claim 1, wherein a cam follower associated with each article-engaging member engages a stationary cam associated with the first device to cause each article-engaging member to pivot to effect transfer of an article therefrom to an article-gripping member.

11. Apparatus as claimed in claim 10 wherein said cam associated with the first device has a profile the major part of which is circular and which has a reentrant portion causing the pivotting movement of the article-engaging members.

12. Apparatus as claimed in claim 11 wherein said cam is formed by a groove provided in a stationary plate associated with the first device.

13. Apparatus as claimed in claim 12 wherein a roller mounted on the inner end of each arm runs in said groove.